United States Patent [19]

Zampino et al.

[11] Patent Number: 5,177,057
[45] Date of Patent: Jan. 5, 1993

[54] REACTION PRODUCT OF LINALOOL WITH CITRIC ACID AND ORGANOLEPTIC USES THEREOF

[75] Inventors: Michael J. Zampino, Roselle Park; Braja D. Mookherjee, Holmdel, both of N.J.

[73] Assignee: International Flavors & Fragrances Inc., New York, N.Y.

[21] Appl. No.: 886,820

[22] Filed: May 22, 1992

Related U.S. Application Data

[63] Continuation-in-part of Ser. No. 809,863, Dec. 19, 1991, Pat. No. 5,137,741.

[51] Int. Cl.$^5$ .............................................. A61K 7/46
[52] U.S. Cl. ........................................ 512/22; 512/1; 512/11; 512/19; 512/25; 512/27
[58] Field of Search ................... 572/1, 11, 22, 25, 19, 572/27

[56] References Cited

U.S. PATENT DOCUMENTS 3,988,432 10/1976 Steltenkamp ..................... 424/49

OTHER PUBLICATIONS

Baxter et al., Tetrahedron, vol. 34, pp. 2195–2199, (1978), "Transformations of Monoterpenoids In Aqueous Acids".

*Primary Examiner*—James H. Reamer
*Attorney, Agent, or Firm*—Arthur L. Liberman

[57] ABSTRACT

Described is the reaction product of linalool with citric acid wherein the reaction is carried out at 100° C. for a period of about two hours in aqueous media. The resulting reaction product contains alpha terpineol having the structure:

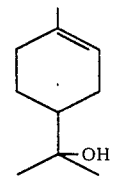

The reaction product of our invention may be used to augment, enhance or impart aromas and tastes to consumable materials including perfume compositions, colognes, perfumed articles including solid or liquid anionic, cationic, nonionic or zwitterionic detergents, fabric softener compositions, hair preparations and the like as well as foodstuffs and chewing gums.

6 Claims, 3 Drawing Sheets

REACTION PRODUCT OF LINALOOL WITH CITRIC ACID AND ORGANOLEPTIC USES THEREOF

This application is a continuation-in-part of application for U.S. Letters Patent, Ser. No. 809,863 filed on Dec. 19, 1991 U.S. Pat. No. 5,137,741.

BACKGROUND OF THE INVENTION

The present invention relates to the reaction product of linalool with citric acid according to the reaction:

is a terpene or or oxygenated terpene as defined on pages 13-19 and 25-31, infra) and uses of such reaction product in augmenting or enhancing the aroma or taste of perfume compositions, perfumed articles, colognes, foodstuffs and chewing gums.

There has been considerable work performed relating to substances which can be used to impart (modify, augment or enhance) flavors and fragrances to (or in) various consumable materials. Such substances are used to diminish the use of expensive natural materials some of which may be in short supply and to provide more uniform properties in the finished product.

Sweet-spicy, warm-citrusy, floral, lilac, lime and sweet-piney aromas with floral, sweet, lilac, citrusy, lime, spicy and warm-herbaceous topnotes are particularly desirable in several types of perfume compositions, perfumed articles and colognes.

Citrus flavors with lemon, lemon peel and orange peel aroma nuances are useful in several types of foodstuffs, particularly flavored gelatin desserts as well as "hot" Szechuan style oriental foods such as orange chicken and orange beef.

The use of reaction products of citric acid with terpenes is well known in the prior art. Thus, U.S. Pat. No. 3,988,432 issued on Oct. 26, 1976 (Steltenkamp) discloses a production of a "synthetic substitute" for steamed-distilled lime oil by means of reacting citral with citric acid at reflux conditions. Baxter, et al, Tetrahedron, Vol. 34, pages 2195-2199 (title "Transformations of Monoterpenoids In Aqueous Acids") discloses interalia the reaction of linalool with aqueous citric acid under mild conditions, e.g., 24° C. However, Baxter, et al shows that under such mild conditions a composition of matter different in kind from the composition of matter of the instant invention is produced. The reaction products of the prior art are different in kind insofar as their organoleptic properties are concerned from the reaction product of the instant invention. The reaction product of the instant invention has unexpected, unobvious and advantageous organoleptic properties when compared to the reaction products of Steltenkamp or Baxter, et al.

DETAILED DESCRIPTION OF THE DRAWINGS

Figure 1:
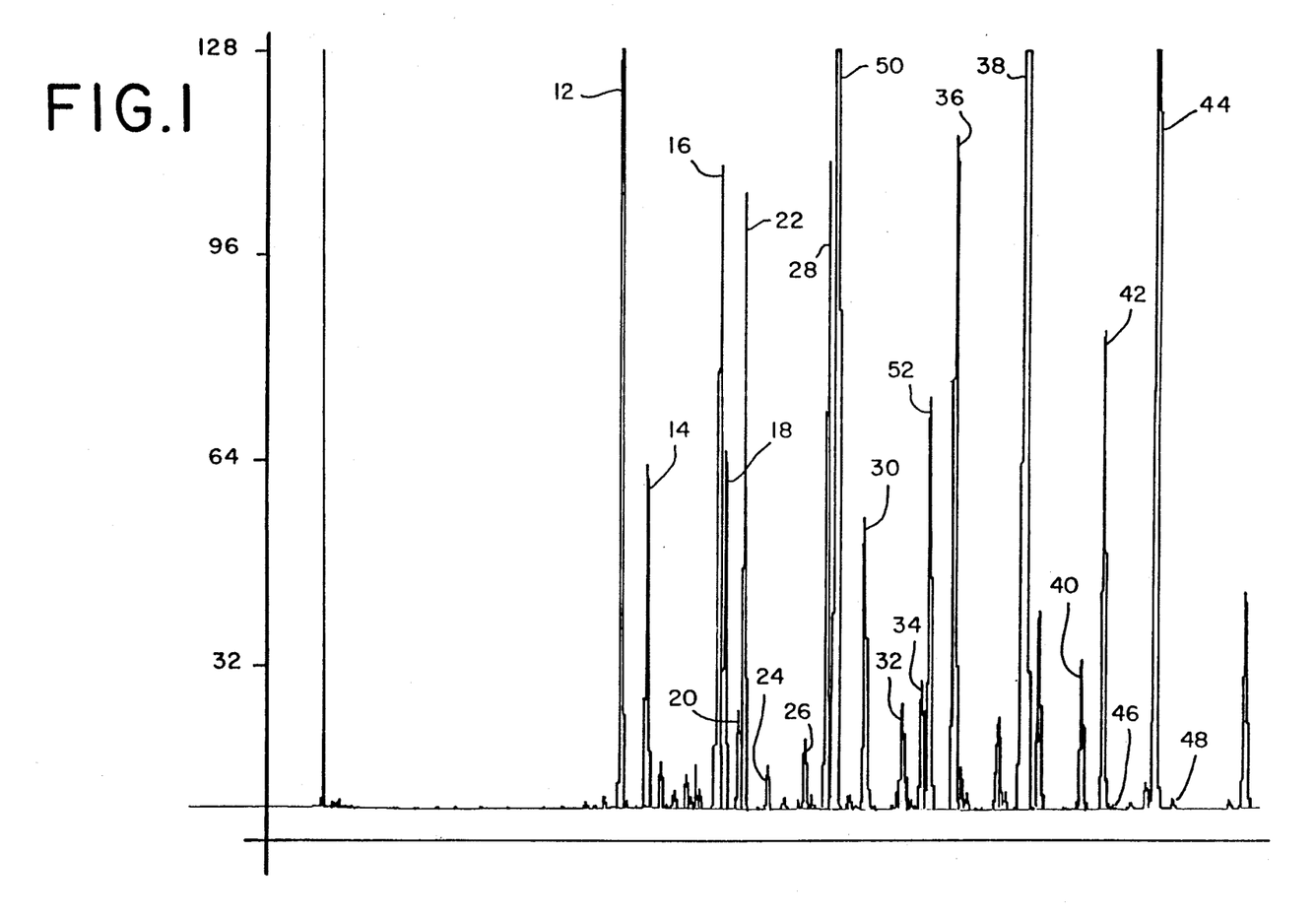
FIG. 1 is the GLC profile (capillary survey) for the distillation product of the reaction product of Example I produced as a result of the reaction of linalool with citric acid at reflux conditions (100° C.) for a period of 2-4 hours.

FIG. 1 is the GLC profile (capillary survey) for the distillation product of the reaction product of Example I, the reaction product of citric acid and linalool at 100° C. for a period of 2 hours (Conditions: 50 meter×0.32 mm methyl silicone column programmed at 75°-225° C. at 2° C. per minute). The peak indicated by reference numeral 10 is the peak for prenol having the structure:

The peak indicated by reference numeral 12 is for Bois de Rose oxide having the structure:

The peak indicated by reference numeral 14 is for myrcene having the structure:

The peak indicated by reference numeral 16 is for limonene having the structure:

The peak indicated by reference numeral 18 is for cis-beta-ocimene having the structure:

The peak indicated by reference numeral 20 is for ocimene quintoxide having the structure:

The peak indicated by reference numeral 22 is for trans-beta-ocimene having the structure:

The peak indicated by reference numeral 24 is for gamma-terpinene having the structure:

The peak indicated by reference numeral 26 is for linalool oxide having the structure:

The peak indicated by reference numeral 28 is for terpinolene having the structure:

The peak indicated by reference numeral 50 is for linalool having the structure:

The peak indicated by reference numeral 30 is for myrcenol having the structure:

The peak indicated by reference numeral 52 is for ocimenol.

Figures 2, 3:
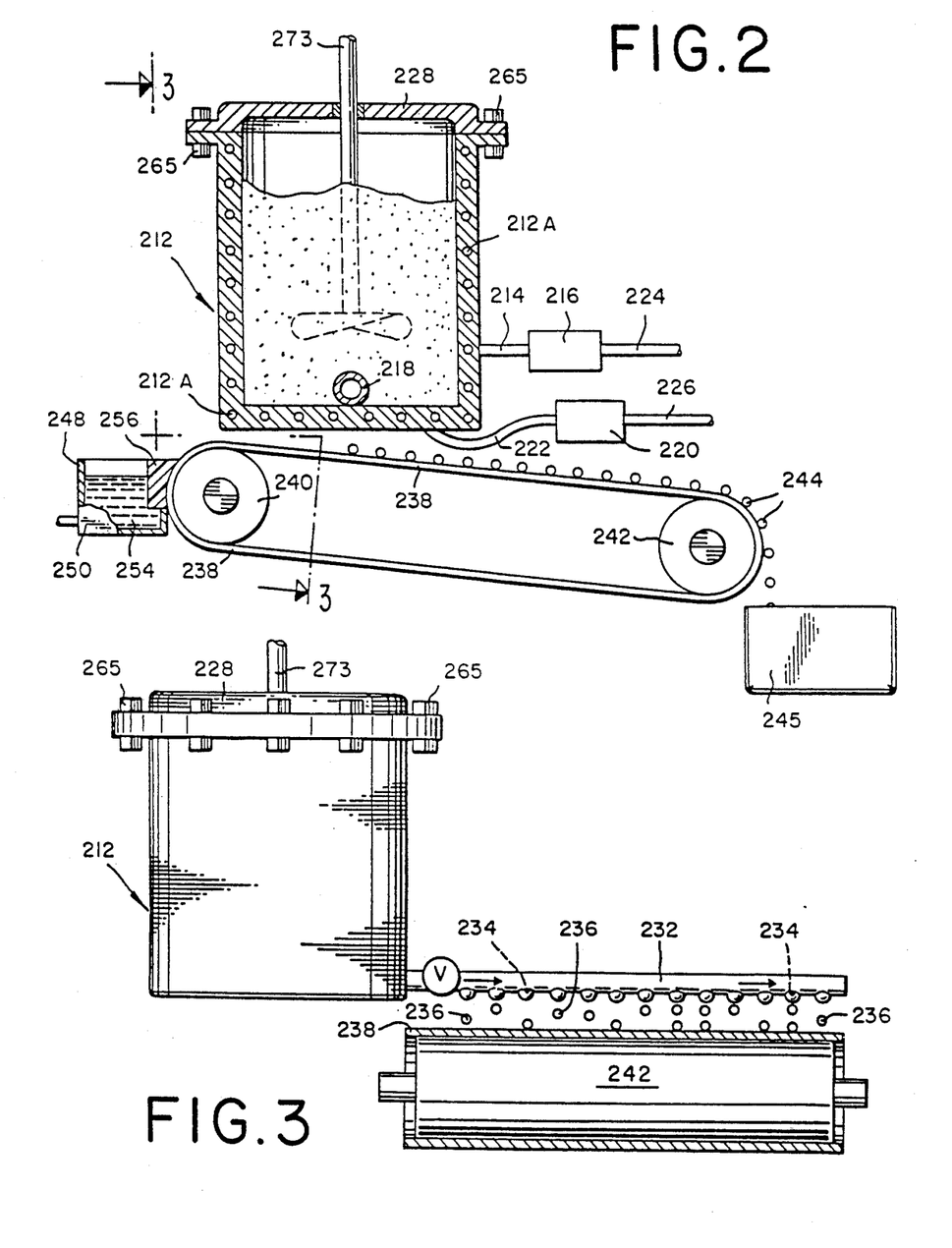
FIG. 2 represents a cut-away side elevation view of apparatus used in forming perfumed polymers containing the reaction product of citric acid and linalool at 100° C. of our invention.
FIG. 3 is a front view of the apparatus of FIG. 2 looking in the direction of the arrows.

The peak indicated by reference numeral 34 is for beta-terpineol having the structure:

The peak indicated by reference numeral 36 is for cis-ocimenol having the structure:

The peak indicated by reference numeral 38 is for alpha-terpineol having the structure:

The peak indicated by reference numeral 40 is for 3,7-dimethyl-1-octen-3,7-diol having the structure:

The peak indicated by reference numeral 42 is for nerol having the structure:

The peak indicted by reference numeral 46 is for neral having the structure:

The peak indicated by reference numeral 44 is for geraniol having the structure:

The peak indicated by reference numeral 48 is for geranial having the structure:

Referring to FIGS. 2 and 3, there is provided a process for forming scented polymer pellets (wherein the polymer may be a thermoplastic polymer such as low density polyethylene or polypropylene or copolymers of ethylene-vinyl acetate or mixtures of a polymer and copolymer such as a copolymer of ethylene-vinyl acetate and polyethylene) such as pellets useful in the formation of plastic particles useful in fabricating certain articles which may be perfumed. This process comprises heating the polymer or mixture of polymers to the melting point of said polymer or mixture of polymers, e.g., 250° C. in the case of low density polyethylene. The lower-most portion of the container is maintained at a slightly lower temperature and the material in the container is taken off at such location for delivery through the conduit. Thus, referring to FIGS. 2 and 3, in particular, the apparatus used in producing such elements comprises a device for forming the polymer containing perfume, e.g., polyethylene or polyethylene-polyvinyl acetate or mixtures of same or polypropylene, or the like, which comprises a vat or container 212 into which the polymer taken alone or in admixture with other copolymers and a perfuming substance containing at least the reaction product of citric acid and linalool of our invention is placed. The container is closed by means of an air-tight lid 228 and clamped to the container by bolts 265. A stirrer 273 traverses the lid or cover 228 in an air-tight manner and is rotatable in a suitable manner.

A surrounding cylinder 212A having heated coils which are supplied with electric current through cable 214 from a rheostat or control 216 is operated to maintain the temperature inside the container 212 such that the polymer in the container will be maintained in the molten or liquid state. It has been found advantageous to employ polymers at such a temperature that the viscosity will be in the range of 90–100 sayboldt seconds.

Heating means (coils 212A) are operated to maintain the upper portion of the container 212 within a temperature range of, for example, 250°–260° C. in the case of low density polyethylene. The bottom portion of the container 212 is also heated by means of heating coils 212A regulated through the control 220 connected thereto through a connecting wire 222 to maintain the lower portion of the container 212 in a temperature range of 225°–240° C.

Thus, the polymer or mixture of polymers added to the container 212 is heated from 10–12 hours, whereafter the perfume composition or perfume material containing at least the reaction product of citric acid and linalool of our invention is quickly added to the melt. Generally, about 10–45 percent by weight of the resulting mixture of the perfumery substance is added to the polymer.

After the perfume material containing at least the reaction product of citric acid and linalool of our invention is added to the container 212, the mixture is stirred for a few minutes, for example, 5–15 minutes and maintained within the temperature ranges indicated previously by the heating coils 212A. The controls 216 and 220 are connected through cables 224 and 226 to a suitable supply of electric current for supplying the power for heating purposes.

Thereafter, the valve "V" is opened permitting the mass to flow outwardly through conduit 232 (also indicated by reference numeral 218 in FIG. 2) having a multiplicity of orifices 234 adjacent to the lower side thereof. The outer end of the conduit 232 is closed so that the liquid polymer intimately admixed with at least the reaction product of citric acid and linalool of our invention will continuously drop through the orifices 234 downwardly from the conduit 232. During this time, the temperature of the polymer intimately admixed with the perfumery substance in the container 212 is accurately controlled so that a temperature in the range of from about 240°–250° C. (in the case of low density polyethylene) will exist in the conduit 232. The regulation of the temperature through the controls 216 and 220 is essential in order to insure temperature bal- ance to provide for the continuous dropping or dripping of molten polymer intimately admixed with the perfume substance containing at least the reaction product of citric acid and linalool of our invention through the orifices 234 at a rate which will insure the formation of droplets 236 which will fall downwardly onto a moving conveyor belt 238 caused to run between the conveyor wheels 240 and 242 beneath the conduit 232.

When the droplets 236 fall onto the conveyor 238 they form pellets 244 which harden almost instanteously and fall off the end of the conveyor 238 into a container 250 which is advantageously filled with water or some other suitable cooling liquid to insure the rapid cooling of each of the pellets 244. The pellets 244 are then collected from the container 250 and utilized for the formation of other functional products, e.g., garbage bags and the like.

Figure 4:
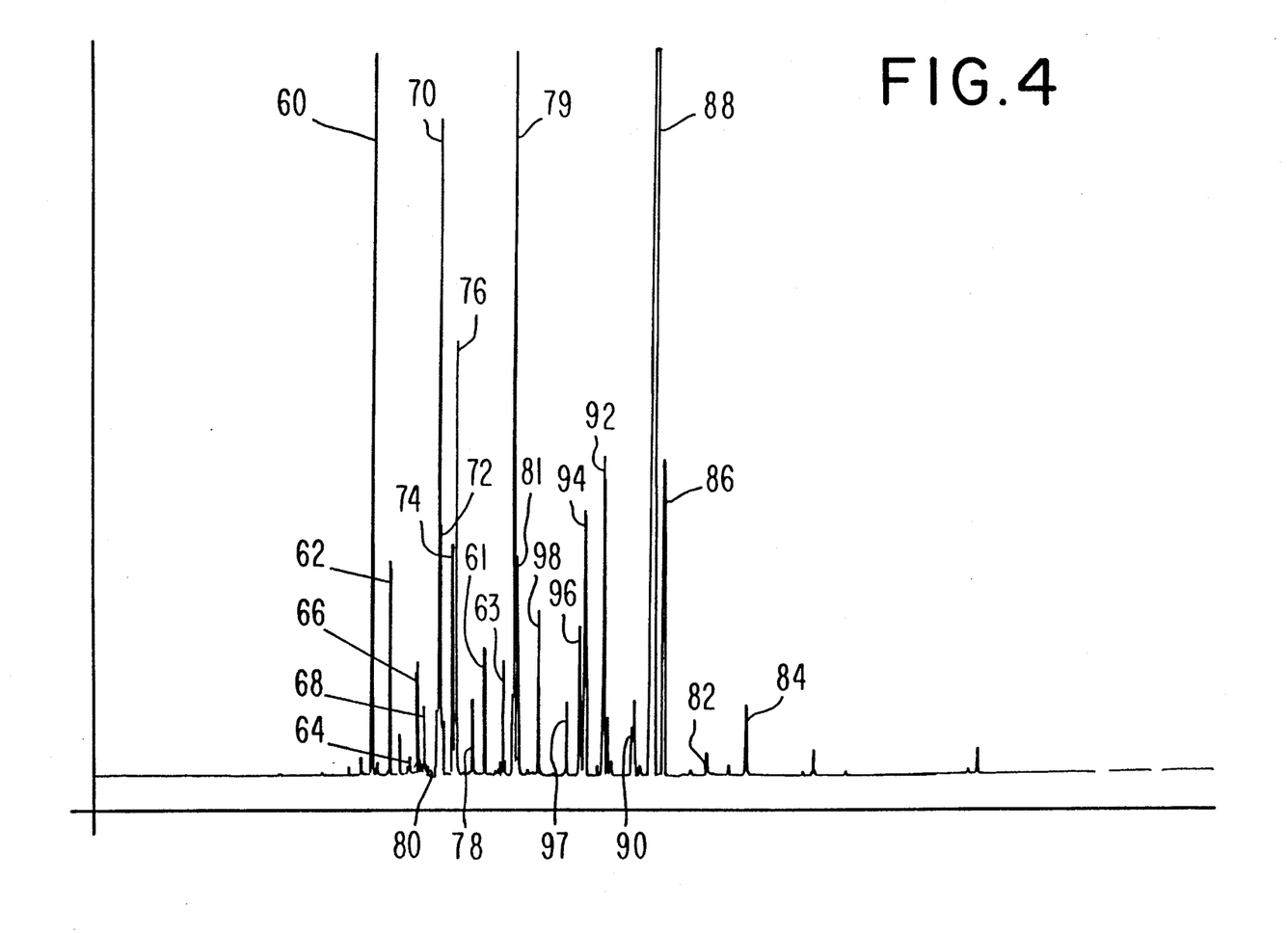
FIG. 4 is the GLC profile (capillary survey) for the distillation product of the reaction product of Example II (Conditions: 50 Meter×0.32 mm fused silica methyl silicone column programmed from 75°-225° C. at 2° C. per minute).

FIG. 4 is the GLC profile (capillary survey) for the distillation product of the reaction product of Example II, the preparation of the reaction product of natural linalool (ex Bois de Rose oxide) with citric acid. The peak indicated by reference numeral 60 is the peak for Bois de Rose oxide. The peak indicated by reference numeral 62 is the peak for myrcene. The peak indicated by reference numeral 64 is the peak for alpha-phellandrene. The peak indicated by reference numeral 66 is the peak for 4-cineole. The peak indicated by reference numeral 68 is the peak for alpha-terpinene. The peak indicated by reference numeral 70 is the peak for a mixture of eucalyptol and limonene. The peak indicated by reference numeral 72 is the peak for cis-ocimene. The peak indicated by reference numeral 74 is for ocimene quintoxide. The peak indicated by reference numeral 76 is the peak for trans-ocimene. The peak indicated by reference numeral 78 is the peak for gamma-terpinene. The peaks indicated by reference numerals 61 and 63 are for linalool oxide. The peak indicated by reference numeral 79 is for terpinolene. The peak indicated by reference numeral 81 is for linalool. The peak indicated by reference numeral 98 is for myrcenol. The peak indicated by reference numeral 97 is for alpha-terpineol. The peak indicated by reference numeral 96 is for beta-terpineol. The peak indicated by reference numeral 94 is for ocimenol (T). The peak indicated by reference numeral 92 is for cis-cimenol. The peak indicated by reference numeral 90 is for 4-terpineol. The peak indicated by reference numeral 88 is for alpha-terpineol. The peak indicated by reference numeral 86 is for gamma-terpineol. The peak indicated by reference numeral 82 is for nerol. The peak indicated by reference numeral 84 is for geraniol.

THE INVENTION

Our invention relates to the reaction product of linalool and citric acid in aqueous media at a temperature of about 100° C. over a period of time of from about two up to about four hours. Thus, linalool having the structure:

is reacted with citric acid in aqueous media to yield a composition of matter containing alpha-terpineol having the structure:

and other compounds indicated by the symbol:

[Z]

according to the reaction:

The compounds indicated by the symbol:

[Z]

are as follows:

prenol having the structure:

Bois de Rose oxide having the structure:

myrcene having the structure:

limonene having the structure:

cis-beta-ocimene having the structure:

gamma-terpinene having the structure:

ocimene quintoxide having the structure:

trans-beta-ocimene having the structure:

linalool oxide having the structure:

terpinolene having the structure:

myrcenol having the structure:

dihydrolinalool having the structure:

beta-terpineol having the structure:

sabinene hydrate having the structure:

3,7-dimethyl-1-octen-3-7-diol having the structure:

nerol having the structure:

geraniol having the structure:

cis-ocimenol having the structure:

geranial having the structure:

H; and neral having the structure:

Table I below sets forth the approximate percentages of each of the compounds of the mixture of our invention:

TABLE I

| Ingredients | Percentage |
| --- | --- |
| Myrcenol | 1.30 |
| Dihydrolinalool | 0.59 |
| Beta-terpineol | 0.61 |
| Sabiene hydrate | 0.49 |
| Alpha-terpineol | 34.37 |
| 3.7-Dimethyl-1-octen-3,7-diol | 0.76 |
| Nerol | 2.54 |
| Geraniol | 9.64 |
| Ocimenol | 1.92 |
| Cis-ocimenol | 3.28 |

TABLE I-continued

| Ingredients | Percentage |
| --- | --- |
| Prenol | 0.01 |
| Bois de Rose oxide | 5.1 |
| Myrcene | 1.2 |
| Limonene | 2.8 |
| Cis-beta-ocimene | 1.4 |
| Gamma-terpinene | 0.02 |
| Ocimene quintoxide | 0.50 |
| Trans-beta-ocimene | 2.5 |
| Linalool oxide | 0.30 |
| Terpinolene | 2.9 |
| Unreacted Linalool | 17.8. |

As stated, supra, the time of reaction may be from 2–4 hours. The temperature of reaction is about 100° C. The weight mole ratio of linalool:citric acid may vary from about 1:10 up to about 10:1. The weight ratio of linalool:water may vary from about 1:5 to about 1:20. A preferred weight ratio range of linalool:citric acid is between 2:1 and 1:2.

At the end of the reaction, the reaction mass is cooled and exists in two phases; an organic phase and an aqueous phase. The organic phase is washed, for example, with saturated sodium chloride and then dried over, for example, anhydrous sodium sulfate. The aqueous phase is washed with methylene dichloride, for example, and the methylene dichloride is then extracted with aqueous sodium chloride. The organic extract, e.g., the methylene chloride extract is concentrated on an evaporator and the organic phases are then combined. The combined organic phases are then fractionally distilled at a temperature range of 55°–65° C. and a pressure range of from about 3 up to about 4 mm/Hg. The distillation temperature range is the vapor temperature range.

Slight variations in the time of reaction will cause the percentages of the above ingredients of the mixture of our invention to vary. However, in each of the cases, the odor descriptors are substantially the same and the flavor descriptors are substantially the same. Thus, the reaction product of citric acid and linalool of our invention has a sweet-spicy, warm-citrusy, floral, lilac, lime, sweet-piney aroma, with floral, sweet, lilac, citrusy, lime, spicy, and warm-herbaceous topnotes.

The reaction product of linalool and citric acid of our invention also has a citrus flavor with lemon, lemon peel and orange peel aroma nuances making it useful as a condiment per se, e.g., in flavoring "orange" chicken or "orange" beef in the Szechuan style of chinese cooking.

Our invention also relates to organoleptic uses of the reaction product of linalool and citric acid under the indicated conditions in augmenting or enhancing the aroma of perfume compositions, colognes or perfumed articles including but not limited to solid or liquid anionic, cationic, nonionic or zwitterionic detergents, fabric softener compositions, fabric softener articles, hair preparations, cosmetic powders and perfumed articles.

The reaction product of linalool and citric acid of our invention and one or more auxiliary perfume ingredients including, for example, alcohols other than the alcohols of the mixture of our invention, aldehydes other than the aldehydes of the mixture of our invention, nitriles, esters, cyclic esters, ketones, ethers, natural essential oils and synthetic essential oils may be admixed so that the combined odors of the individual components produce a pleasant and desired fragrance particularly and preferably in floral, lilac and "muguet" fragrances Such perfume compositions usually contain (a) the main note or the "bouquet" or foundation stone of the composition; (b) modifiers which round off and accompany the main note; (c) fixatives which include odorous substances which lend a particular note to the perfume throughout all stages of evaporation and substances which retard evaporation; and (d) topnotes which are usually low-boiling, fresh smelling materials.

In perfume compositions, it is the individual components which contribute to its particular olfactory characteristics, but the over-all effect of the perfume composition will be the sum of the effects of each of the ingredients. Thus, the reaction product of citric acid and linalool of our invention and one or more auxiliary perfume ingredients can be used to alter the aroma characteristics of a perfume composition, for example, by utilizing or moderating the olfactory reaction contributed by at least one other ingredient in the composition (apart from the mixture of our invention).

The amount of the reaction product of citric acid and linalool of our invention useful in perfume compositions for augmentation, enhancement or imparting of sweet-spicy, warm-citrusy, floral, lilac, lime and sweet-piney aromas, with floral, sweet, lilac, citrusy, lime, spicy and warm-herbaceous topnotes may vary from about 1% by weight of the perfume composition up to 100% by weight of the perfume composition (the entire composition can be composed of the the reaction product of citric acid and linalool).

The linalool-citric acid reaction product of our invention and one or more auxiliary perfume ingredients can be used to impart such aroma nuances, topnotes and undertones to soaps anionic, cationic, nonionic or zwitterionic detergents, fabric softener compositions, fabric softener articles, cosmetic powders, hair preparations and the like. The amount employed can range up to 100% by weight of the fragrance components and can range up to approximately 0.5% of the weight of the perfumed article and will depend upon considerations of cost, nature of the end product, the effect desired on the finished product and the particular fragrance sought.

The reaction product of citric acid and linalool of our invention and one or more auxiliary perfume ingredients are useful, taken alone or in perfume compositions as olfactory components in anionic, cationic, nonionic or zwitterionic detergents, soaps, fabric softener compositions, fabric softener articles for use in clothes dryers, (e.g., "BOUNCE ®", a registered trademark of the Procter & Gamble Company of Cincinnati, Ohio), space odorants and deodorants, perfumes, colognes, toilet waters, bath preparations, such as lacquers, brilliantines, creams, deodorants, hand lotions and sun screens; powders such as talcs, dusting powders, face powders and the like.

When used as an olfactory component in perfume compositions or perfumed articles, such as anionic, cationic, nonionic or zwitterionic detergents and fabric softener compositions and fabric softener articles (e.g., for use in clothing dryers) as little as 0.05% of the reaction product of citric acid and linalool of our invention will suffice to impart aroma nuances as set forth above. Generally, no more than 0.5% of the reaction product of citric acid and linalool of our invention and one or more auxiliary perfume ingredients based on the ultimate end product is required in the perfumed article.

In addition, the perfume composition or fragrance composition of our invention can contain a vehicle or carrier for the reaction product of linolool and citric acid of our invention. The vehicle can be a liquid such as a non-toxic alcohol, a non-toxic glycol, or the like. The carrier can also be absorbent solid, such as a gum (e.g., gum arabic, xanthan gum or guar gum) or components for encapsulating the composition (such as gelatin as by means of coacervation).

When the reaction product of linalool and citric acid of our invention is used as a food flavor adjuvant, the nature of the coingredients included with the reaction product of linalool and citric acid used in formulating the product composition will also serve to alter, modify, augment or enhance the organoleptic characteristics of the ultimate foodstuff treated therewith.

As used herein in regard to flavors, the terms "alter", "modify" and "augment" in their various forms means "supplying or imparting flavor character or note to otherwise bland, relatively tasteless substances or augmenting the existing flavor characteristic where a natural flavor is deficient in some regard or supplementing the existing flavor impression to modify its quality, character or taste".

The term "enhance" is used herein to mean the intensification of a flavor or aroma characteristic or note without the modification of the quality thereof. Thus, "enhancement" of a flavor or aroma means that the enhancement agent does not add any additional flavor note.

As used herein, the term "foodstuff" includes both solid and liquid ingestible materials which usually do, but need not, have nutritional value. Thus, foodstuffs include soups, convenience foods, beverages, dairy products, candies, chewing gums, vegetables, cereals, soft drinks, snacks and the like.

As used herein, the term "medicinal product" includes both solids and liquids which are ingestible non-toxic materials which have medicinal value such as cough syrups, cough drops, aspirin and chewable medicinal tablets.

The term "chewing gum" is intended to mean a composition which comprises a substantially water-insoluble chewable plastic gum base such as chicle, or substitutes therefor, including jelutong, guttakay rubber or certain comesible natural or synthetic resins or waxes. Incorporated with the gum base in admixture therewith may be plasticizers or softening agents, e.g., glycerine; and a flavoring composition which incorporates the reaction product of citric acid and linalool of our invention and, in addition, sweetening agents which may be sugars, including sucrose or dextrose and/or artificial sweeteners such as cyclamates or saccharine. Other optional ingredients may also be present.

Substances for use herein as co-ingredients or flavoring adjuvants are well known in the art for such use, being extensively described in the relevant literature. It is a requirement that any such material be "ingestibly" acceptable and thus non-toxic and otherwise non-deleterious particularly from an organoleptic standpoint whereby the ultimate flavor and/or aroma of the consumable material used is not caused to have unacceptable aroma and taste nuances. Such materials may, in general, be characterized as flavoring adjuvants or vehicles comprising broadly stabilizers, thickeners, surface active agents, conditioners, other flavorants and flavor intensifiers.

Stabilizer compounds include preservatives, e.g., sodium chloride; antioxidants, e.g., calcium and sodium ascorbate, ascorbic acid, butylated hydroxy-anisole (mixture of 2- and 3-tertiary-butyl-4-hydroxy-anisole), butylated hydroxy toluene (2,6-di-tertiary-butyl-4-methyl phenol), propyl gallate and the like and sequestrants, e.g., citric acid.

Thickener compounds include carriers, binders, protestive colloids, suspending agents, emulsifiers and the like, e.g., agar agar, carrageenan; cellulose and cellulose derivatives such as carboxymethyl cellulose and methyl cellulose; natural and synthetic gums such as gum arabic, gum tragacanth; gelatin, proteinaceous materials, lipids, carbohydrates; starches, pectins and emulsifiers, e.g., mono- and diglycerids of fatty acids, skim milk powder, hexoses, pentoses, disaccharides, e.g., sucrose, corn syrup and the like.

Surface active agents include emulsifying agents, e.g., fatty acids such as capric acid, caprylic acid, palmitic acid, myristic acid and the like, mono- and diglycerides of fatty acids, lecithin, defoaming and flavor-dispersing agents such as sorbitan monostearate, potassium stearate, hydrogenated tallow alcohol and the like.

Conditioners include compounds such as bleaching and maturing agents, e.g., benzoyl peroxide, calcium peroxide, hydrogen peroxide and the like, starch modifiers such as peracetic acid, sodium chlorite, sodium hypochlorite, propylene oxide, succinic anhydride and the like, buffers and neutralizing agents, e.g., sodium acetate, ammonium bicarbonate, ammonium phosphate, citric acid, lactic acid, vinegar and the like, colorants, e.g., arminic acid, cochineal, tumeric and curcuma and the like; firming agents such as aluminum sodium sulfate, calcium chloride and calcium gluconate; texturizers, anti-caking agents, e.g., aluminum calcium sulfate and tribasic calcium phosphate; enzymes; yeast foods, e.g., calcium lactate and calcium sulfate; nutrient supplements, e.g., iron salts such as ferric phosphate, ferrous gluconate and the like, riboflavin, vitamins, zinc sources such as zinc chloride, zinc sulfate and the like.

Other flavorants and flavor intensifiers include organic acids, e.g., acetic acid, formic acid, 2-hexenoic acid, benzoic acid, n-butyric acid, caproic acid, caprylic acid, cinnamic acid, isobutyric acid, isovaleric acid, alpha-methyl-butyric acid, propionic acid, valeric acid, 2-methyl-2-pentenoic acid and 2-methyl-3-pentenoic acid; ketones and aldehydes, e.g., acetaldehyde, acetophenone, acetone, acetyl methyl carbinol, acrolein, n-butanal, cortonal, diacetyl, 2-methyl butanal, $\beta,\beta$-dimethyl acrolein, methyl-n-amyl ketone, n-hexanal, 2-hexenal, isopentanal, hydrocinnamic aldehyde, cis-3-hexenal, 2-heptenal nonyl aldehyde, 4-(p-hydroxyphenyl)-2-butanone, alpha-ionone, beta-ionone, methyl-3-butanone, benzaldehyde, $\beta$-damascone, $\beta$-damascenone, acetophenone, o-heptanone, o-hydroxyacetophenone, 2-methyl-2-hepten-6-one, 2-octanone, 2-undecanone, 3-phenyl-4-pentenal, 2-phenyl-2-hexenal, 2-phenyl-2-pentenal, furfural, 5-methyl furfural, cinnamaldehyde, beta-cyclohomocitral, 2-pentanone, 2-pentenal and propanal; alcohols such as 1-butanol, benzyl alcohol, 1-borneol, trans-2-buten-1-ol, ethanol, geraniol, 1-hexanol, 2-heptanol, trans-2-hexenol-1, cis-3-hexen-1-ol, 3-methyl-3-buten-ol, 1-pentanol, 1-penten-3-ol, p-hydroxyphenyl-2-ethanol, isoamyl alcohol, isofenchyl alcohol, phenyl-2-ethanol, alpha-terpineol, cis-terpineol hydrate, eugenol, linalool, 2-heptanol, acetoin; esters, such as butyl acetate, ethyl acetate, ethyl acetoacetate, ethyl benzoate, ethyl butyrate, ethyl caprate, ethyl caproate, ethyl caprylate, ethyl cinnamate, ethyl crotonate, ethyl formate, ethyl isobutyrate, ethyl isovalerate, ethyl laurate, ethyl myristate, ethyl alpha-methylbutyrate, ethyl propionate, ethyl salicylate, trans-2-hexenyl acetate, n-hexyl acetate, 2-hexenyl butyrate, hexyl butyrate, isoamyl acetate, isopropyl butyrate, methyl acetate, methyl butyrate, methyl caproate, methyl isobutyrate, alpha-methylphenylglycidate, ethyl succinate, isobutyl cinnamate, cinnamyl formate, methyl cinnamate and terpenyl acetate; hydrocarbons such as dimethyl naphthalene, dodecane, methyl diphenyl, methyl naphthalene, myrcene, naphthalene, octadecane, tetradecane, tetramethyl naphthalene, tridecane, trimethyl naphthalene, undecane, caryophyllene, 1-phellandrene, p-cymene, 1-alpha-pinene; pyrazines, such as 2,3-dimethylpyrazine, 2,5-dimethylpyrazine, 2,6-dimethylpyrazine, 3-ethyl-2,5-dimethylpyrazine, 2-ethyl-3,5,6-trimethylpyrazine, 3-isoamyl-2,5-dimethylpyrazine, 5-iisoamyl-2,3-dimethylpyrazine, 2-isoamyl-3,5,6-trimethylpyrazine, isopropyl dimethylpyrazine, methyl ethylpyrazine, tetramethylpyrazine, trimethylpyrazine; essential oils, such as jasmine absolute, cassia oil, cinnamon bark oil, rose absolute, orris absolute, lemon essential oil, Bulgarian rose, yara yara and vanilla; lactones, such as gamma-nonalactone; sulfides, e.g., methyl sulfide and other materials such as maltol, acetoin and acetals (e.g., 1,1-diethoxyethane, 1,1-dimethoxyethane and dimethoxy-methane).

The specific flavoring adjuvant selected for use may be either solid or liquid depending upon the desired physical form of the ultimate product, i.e., foodstuff, whether simulated or natural, and should, in any event, (i) be organoleptically compatible with the reaction product of citric acid and linalool of our invention by not covering or spoiling the organoleptic properties (aroma and/or taste) thereof; (ii) be non-reactive with the reaction product of citric acid and linalool of our invention and (iii) be capable of providing an environment in which the reaction product of citric acid and linalool of our invention can be dispersed or admixed to provide a homogeneous medium. In addition, selection of one or more flavoring adjuvants, as well as the quantities thereof will depend upon the precise organoleptic character desired in the finished product. Thus, in the case of flavoring compositions, ingredient selection will vary in accordance with the foodstuff, chewing gum, medicinal product or toothpaste or chewing tobacco to which the flavor and/or aroma are to be imparted, modified, altered or enhanced. In contradistinction, in the preparation of solid products, e.g., simulated foodstuffs, ingredients capable of providing normally solid compositions should be selected such as various cellulose derivatives.

As will be appreciated by those skilled in the art, the amount of the reaction product of citric acid and linalool of our invention employed in a particular instance can vary over a relatively wide range, depending upon the desired organoleptic effects to be achieved. Thus, correspondingly greater amounts would be necessary in those instances wherein the ultimate food composition to be flavored (e.g., a "orange-raisin-rum cake") is relatively bland to the taste, whereas relatively minor quantities may suffice for purposes of enhancing the composition merely deficient in natural flavor or aroma, (e.g., when actual orange peel, raisins and rum are present in the foodstuff such as the cake). The primary requirement is that the amount selected be effective, i.e., sufficient to alter, modify, or enhance the organoleptic characteristics of the parent composition, whether foodstuff per se, chewing gum per se, medicinal product per se, toothpaste per se, chewing tobacco per se or flavoring composition.

The use of sufficient quantities of the reaction product of citric acid and linalool of our invention will, of course, substantially vitiate any possibility of obtaining the desired results while excess quantities prove needlessly costly and in extreme cases, may disrupt the flavor/aroma balance, thus proving self-defeating. Accordingly, the terminology "effective amount" and "sufficient amount" is to be accorded a significance in the context of the present invention consistent with the obtention of desired flavoring effects.

Thus, and with respect to ultimate food compositions, chewing gum compositions, medicinal product compositions, chewing tobacco compositions and toothpaste compositions, it is found that quantities of the reaction product of citric acid and linalool of our invention ranging from a small but effective amount, e.g., about 0.05 parts per million up to about 250 parts per million based on total food composition or chewing gum composition, or medicinal product composition or tobacco composition or chewing tobacco composition are suitable Concentrations in excess of the maximum quantity stated are not normally recommended since they fall to provide commensurate enhancement of organoleptic properties. In those instances where the reaction product of citric acid and linalool of our invention are added to the foodstuff as an integral component of a flavoring composition, it is, of course, essential that the total quantity of flavoring composition employed be sufficient to yield an effective concentration of the reaction product of citric acid and linalool in the foodstuff product.

Food flavoring compositions containing the reaction product of linalool and citric acid of our invention preferably contain such reaction product in concentrations ranging from about 0.02% up to about 15% by weight of the total weight of said flavoring composition.

The compositions described herein can be prepared according to conventional techniques well known as typified by cake batters and fruit drinks as well as shredded meat platters, e.g., orange flavor chicken and orange flavor beef (according to the Szechuan style chinese cooking) and can be formulated by merely admixing the involved ingredients within the proportions stated in a suitable blender, for example, to obtain the desired consistency, homogeneity of dispersion, etc. Alternatively, flavoring compositions in the form of particulate solids can be conveniently prepared by mixing the reaction product of linalool and citric acid of our invention with, for example, gum arabic, gum tragacanth, xanthan gum, carrageenan and the like, and thereafter spray-drying the resultant mixture whereby to obtain the particulate solid product Pre-prepared flavor mixes in powder form, e.g., a fruit flavored or rum flavored powder mix are obtained by mixing the dried solid components, e.g., starch, sugar and the like and the reaction product of linalool and citric acid of our invention in a dry blender until the requisite degree of uniformity is achieved.

It is presently preferred to combine the reaction product of linalool and citric acid of our invention with at least one of the following adjuvants:
p-Hydroxybenzyl acetone;
Genaniol;
Cassia Oil;
Acetaldehyde;
Maltol;
Ethyl methyl phenyl glycidate;
Benzyl acetate;
Dimethyl sulfide;
Eugenol;
Vanillin
Caryophyllene;
Methyl cinnamate;
Guiacol;
Ethyl pelargonate;
Cinnamaldehyde;
Methyl Anthranilate;
5-Methyl furfural;
Isoamyl Acetate;
Isobutyl Acetate;
Cuminaldehyde;
Alpha-Ionone;
Cinnamyl formate;
Ethyl butyrate;
Methyl cinnamate;
Acetic acid;
Gamma-undecalactone;
Naphthyl ethyl ether;
Diacetyl;
Furfural;
Ethyl acetate;
Anethol;
2,3-Dimethyl pyrazine;
2-Ethyl-3-methyl pyrazine;
3-Phenyl-4-pentenal
2-Phenyl-2-hexenal;
2-phenyl-2-pentenal;
3-Phenyl-4-pentenal diethyl acetal;
Beta-Damascone (1-crotonyl-2,6,6-trimethylcyclohex-1-ene);
Beta-Damascenone (1-crotonyl-2,6,6-trimethylcyclohexa-1,3-diene);
Beta-cyclohomocitral (2,6,6-trimethylcyclohex-1-ene-carboxaldehyde);
Isoamyl butyrate;
Cis-3-hexenol-1;
2-Methyl-2-pentenoic acid;
Elemecine (4-allyl-1,2,6-trimethoxybenzene;
Isoelemecine (4-propenyl-1,2,6-trimethoxybenzene);
2-(4-Hydroxy-4-methylpentyl)norbornadiene rum essence;
3-Hydroxy butyric acid;
2-Hydroxy butyric acid;
N-methylanthranilate cyclotene;
Ethyl cyclotene;
n-Propyl cyclotene; and
Gin berry essence.

The following Examples I and II illustrate methods of our invention used to manufacture the reaction product of linalool and citric acid of our invention. Examples III and Examples following Example III serve to illustrate the organoleptic utilities of the reaction product of linalool and citric acid of our invention.

All parts and percentages given herein are by weight unless otherwise specified.

EXAMPLE I

Preparation Of Reaction Product Of Linalool And Citric Acid

Into a 2 liter reaction flask equipped with stirrer, thermometer, reflux condenser and heating mantle are placed 150 grams of synthetic linalool having the structure:

and a solution of 180 grams of citric acid in 1250 ml water.

The reaction mass is heated, with stirring, to reflux over a period of one hour. At 100° C. and one atmosphere pressure, the reaction mass is refluxed for a period of two hours. The reaction mass is then cooled to room temperature over a period of one hour.

The reaction mass is transferred to a separatory funnel and the organic phase is separated from the aqueous phase.

The organic phase is washed with three 150 ml volumes of saturated sodium chloride.

The organic phase is then dried over anhydrous sodium sulfate.

The aqueous phase is washed with two 50 ml volumes of methylene dichloride; and the methylene chloride extract is then washed with two volumes of saturated sodium chloride until neutral. The methylene chloride extract is concentrated on a rotovap evaporator. The organic phases are then combined and distilled at 60° C. vapor temperature, 90° C. liquid temperature and 3.2 mm/Hg. vacuum. The resulting product has a sweet-spicy, warm-citrusy, floral, lilac, lime, sweet-piney aroma, with floral, sweet, lilac, citrusy, lime, spicy, warm-herbaceous topnotes.

From a flavor standpoint the resultant product has a citrus flavor with lemon, lemon peel and orange peel aroma nuances.

FIG. 1 is the GLC profile for the distillation product (capillary survey). (Conditions: 50 meter×0.32 mm bonded methyl silicone column programmed at 75°–225° C. at a rate of 2° C. per minute).

The resulting product contains 1.30% myrcenol having the structure:

0.59% dihydrolinalool having the structure:

0.61% beta-terpineol having the structure:

0.49% sabinene hydrate having the structure:

34.37% alpha-terpineol having the structure:

0.76% 3,7-dimethyl-1-octen-3,7-diol having the structure:

9.64% geraniol having the structure:

1.92% ocimenol
3.28% cis-ocimenol having the structure:

0.01% prenol having the structure:

5.1% Bois de Rose oxide having the structure:

1.2% myrcene having the structure:

2.8% limonene having the structure:

1.4% cis-beta-ocimene having the structure:

gamma-terpinene having the structure:

2.5% trans-beta-ocimene having the structure:

0.30% linalool oxide having the structure:

2.9% terpinolene having the structure:

17.8% linalool having the structure:

geranial having the structure:

neral having the structure:

EXAMPLE II

The procedure of Example I is carried out with the exception that in place of synthetic linalool having the structure:

natural linalool is used. The resulting product has substantially the same organoleptic properties as the product of Example I but in addition, has natural nuances which cause it to be useful in lime, lemon, grapefruit, mint and black currant flavored foodstuffs.

FIG. 4 is the GLC profile (capillary survey) for the distillation product of the reaction product of Example II. The individual peaks are identified in the "Detailed Description of The Drawings" section of the instant specification, supra.

EXAMPLE III

Pine Fragrance

The following pine fragrance formulation is produced:

| Ingredients | Parts by Weight |
|---|---|
| Isobornyl acetate | 100 |
| Camphor | 10 |
| Fir balsam absolute | 45 |

| Ingredients | Parts by Weight |
|---|---|
| (50% in diethyl phthalate) | |
| Courmarin | 8 |
| Fenchyl alcohol | 40 |
| Anethol | 12 |
| Borneol | 25 |
| Galbanum oil | 25 |
| Eucalyptol | 50 |
| 2,2,6-trimethyl-1-cyclohexene-1-carboxaldehyde | 20 |
| Maltol (1% in diethyl phthalate) | 20 |
| Reaction product of Linlool and Citric Acid produced according to Example I | 50. |

The resulting pin fragrance has excellent muguet, sweet-spicy, warm-citrusy, floral, lilac, lime and sweet-piney undertones, with floral, sweet, lilac, muguet, citrusy, lime, spicy and warm-herbaceous topnotes. Accordingly, the resulting fragrance can be described as "having a piney aroma with muguet, sweet-spicy, warm-citrusy, with floral, lilac, lime and sweet-piney undertones with floral, sweet, lilac, muguet, citrusy, lime, spicy and warm-herbaceous topnotes".

EXAMPLE IV

Preparation Of Cosmetic Powder Compositions

Cosmetic powder compositions are prepared by mixing in a ball mill 100 grams of talcum powder with 0.25 grams of each of the substances set forth in Table II below. Each of the cosmetic powder compositions has an excellent aroma as described in Table II below:

| Substance | Aroma Description |
|---|---|
| Reaction product of Linalool and Citric Acid prepared according to Example I. | A sweet-spicy, warm-citrusy, floral, lilac, lime, sweet-piney aroma with floral, sweet, lilac, citrusy, lime, spicy and warm-herbaceous topnotes. |
| Reaction product of Linalool and Citric Acid prepared according to Example II. | A sweet-spicy, warm-citrusy, floral, lilac, lime and sweet-piney aroma with floral, sweet, lilac, citrusy, lime, spicy and warm-herbaceous topnotes. |
| Perfume composition of Example III. | A piney aroma with muguet, sweet-spicy, warm-citrusy, floral, lilac, lime and sweet-piney undertones with floral, sweet, lilac, muguet, citrusy, lime, spicy and warm-herbaceous topnotes. |

EXAMPLE V

Perfumed Liquid Detergents

Concentrated liquid detergents (Lysine sale of n-dodecylbenzene sulfonic acid as more specifically described in U.S. Pat. No. 3,948,818 issued on Apr. 6, 1976) with aroma nuances as set forth in Table II of Example IV are prepared containing 0.10%, 0.15%, 0.20%, 0.25%, 0.30% and 0.35% of the substance set forth in Table II of Example IV. They are prepared by adding and homogeneously mixing the appropriate quantity of substance set forth in Table II of Example IV below in the liquid detergent. The detergents all possess excellent aromas as set forth in Table II of Example IV, the intensity increasing with greater concentrations of substance as set forth in Table II of Example IV.

EXAMPLE VI

Preparation Of Colognes And Handkerchief Perfumes

Compositions as set forth in Table II of Example IV are incorporated into colognes at concentrations of 2.0%, 2.5%, 3.0%, 3.5%, 4.0%, 4.5% and 5.0% in 80%, 85%, 90% and 95% aqueous food grade ethanol solutions; and into handkerchief perfumes at concentrations of 15%, 20%, 25% and 30% (in 80%, 85%, 90% and 95% aqueous food grade ethanol solutions). Distinctive and definitive fragrances as set forth in Table II of Example IV are imparted to the colognes and to the handkerchief perfumes at all levels indicated.

EXAMPLE VII

Preparation Of Soap Compositions

One hundred grams of soap chips [per sample] (IVORY ®, produced by the Procter & Gamble Company of Cincinnati, Ohio), are each mixed with one gram samples of substances as set forth in Table II of Example IV until homogeneous compositions are obtained. In each of the cases, the homogeneous compositions are heated under 8 atmospheres pressure at 180° C. for a period of three hours and the resulting liquids are placed into soap molds. The resulting soap cakes, on cooling, manifest aromas as set forth in Table II of Example IV.

EXAMPLE VIII

Preparation Of Solid Detergent Compositions

Detergents are prepared using the following ingredients according to Example I of Canadian Patent No. 1,007,948:

| Ingredient | Percent by Weight |
|---|---|
| "NEODOL ® 45-11 (a $C_{14}$-$C_{15}$ alcohol ethoxylated with 11 moles of ethylene oxide | 12 |
| Sodium carbonate | 55 |
| Sodium citrate | 20 |
| Sodium sulfate, water brighteners | q.s. |

This detergent is a phosphate-free detergent. Samples of 100 grams each of this detergent are admixed with 0.10, 0.15, 0.20 and 0.25 grams of each of the substances as set forth in Table II of Example IV. Each of the detergent samples has an excellent aroma as indicated in Table II of Example IV.

EXAMPLE IX

Utilizing the procedure of Example I at column 15 of U.S. Pat. No. 3,632,396, non-woven cloth substrates useful as dry-added fabric softening articles of manufacture are prepared wherein the substrate, the substrate coating and the outer coating and the perfuming material are as follows:
1. A water "disolvable" paper ("Dissolvo Paper");
2. Adogen 448 (m.p. about 140° F.) as the substrate coating; and
3. An outer coating having the following formulation (m.p. about 150° F.):
   57%—$C_{20-22}$HAPS
   22%—isopropyl alcohol
   20%—anti-static agent
   1%—of one of the substances as set forth in Table II of Example IV.

Fabric softening compositions prepared according to Example I at column 15 of U.S. Pat. No. 3,632,396 having aroma characteristics as set forth in Table II of Example IV, consist of a substrate coating having a weight of about 3 grams per 100 square inches of substrate; a first coating on the substrate coating consisting of about 1.85 grams per 100 square inches of substrate; and an outer coating coated on the first coating consisting of about 1.4 grams per 100 square inches of substrate. One of the substances of Table II of Example IV is admixed in each case with the outer coating mixture, thereby providing a total aromatized outer coating weight ratio to substrate of about 0.5:1 by weight of the substrate. The aroma characteristics are imparted in a pleasant manner to the head space in a dryer on operation thereof in each case using said drier-added fabric softener non-woven fabrics and these aroma characteristics are described in Table II of Example IV.

EXAMPLE X

Hair Spray Formulations

The following hair spray formulation is prepared by first dissolving PVP/VA E-735 copolymer manufactured by the GAF Corporation of 140 West 51st Street, New York, N.Y., in 91.62 grams of 95% food grade ethanol, 8.0 grams of the polymer is dissolved in the alcohol. The following ingredients are added to the PVP/VA alcoholic solution:

| Ingredients | Weight Percent |
|---|---|
| Dioctyl sebacate | 0.05 |
| Benzyl alcohol | 0.10 |
| Dow Corning 473 fluid (prepared by the Dow Corning Corporation) | 0.10 |
| TWEEN ® 20 surfactant (prepared by ICI America Corporation) | 0.03 |
| One of the perfumery substances as set forth in Table II of Example IV | 0.10 |

The perfuming substances as set forth in Table II of Example IV add aroma characteristics as set forth in Table II of Example IV which are rather intense and aesthetically pleasing to the users of the soft-feel, good-hold pump hair sprays.

EXAMPLE XI

Conditioning Shampoos

Monamid CMA (prepared by the Mona Industries Company)(3.0 weight percent) is melted with 2.0 weight percent coconut fatty acid (prepared by Procter & Gamble Company of Cincinnati, Ohio); 1.0 percent ethylene glycol distearate (prepared by the Armak Corporation) and triethanolamine (a product of Union Carbide Corporation)(1.4 weight percent). The resulting melt is admixed with Stepanol WAT produced by the Stepan Chemical Company (35.0 weight percent). The resulting mixture is heated to 60° C. and mixed until a clear solution is obtained (at 60° C).

GAFQUAT ® 755N polymer (manufactured by GAF Corporation of 140 West 51st Street, New York, N. Y.( (5.0 weight percent) is admixed with 0.1 weight percent sodium sulfite and 1.4 weight percent polyethylene glycol 6000 distearate produced by Armak Corporation.

The resulting material is then mixed and cooled to 45° C. and 0.3 weight percent of perfuming substance as set forth in Table II of Example IV is added to the mixture. The resulting mixture is cooled to 40° C. and blending is carried out for an additional one hour in each case. At the end of this blending period, the resulting material has a pleasant fragrance as indicated in Table II of Example IV.

EXAMPLE XII

Flavor Formulations And Use Thereof

At the rate of 0.4 ppm, the reaction product of linalool and citric acid prepared according to Example II is added to a slurry containing water and 70% by weight of chopped orange peel having an average length of 1.5" and a width of 0.25"; and a thickness of 0.02". The resulting slurry is then filtered and carefully dried at 45° F. in a forced air dryer. The resulting "flavored" orange peel is then added to shredded beef in a wok and cooked in the wok with nutmeg, tamerind, garlic and soy sauce for a period of 0.82 hours with constant stirring. The resulting "orange flavored beef" has a much more natural aroma and taste nuance pattern than standard "orange beef".

EXAMPLE XIII

Orange Marmalade

At the rate of 0.15 ppm. the reaction product of linalool and citric prepared according to Example I is added to SMUCKERS ® marmalade preserves. The resulting marmalade preserves retain their original fresh flavor after being removed from the vacuum jar in which it was originally marketed and the original marmalade flavor is retained for a period of six weeks when the resulting preserves are refrigerated in a standard kitchen refrigerator; and indeed retain all "natural" nuances.

What is claimed is:

1. A process for preparing a reaction product comprising the step of intimately admixing citric acid and linalool for a period of from 2-4 hours at a temperature of approximately 100° C. and a pressure of approximately one atmosphere in aqueous solution.

2. The product prepared according to the process of claim 1.

3. A process for augmenting or enhancing the aroma of a consumable material selected from the group consisting of perfume compositions, colognes and perfumed articles comprising the step of intimately admixing with said consumable material an aroma augmenting or enhancing quantity of the product of claim 2.

4. A perfume formulation comprising a perfume base and intimately admixed therewith an aroma imparting, augmenting or enhancing quantity of the product of claim 2.

5. A cologne comprising ethanol, water and an aroma imparting quantity of the product of claim 2.

6. A perfumed article comprising a perfumed article base and an aroma imparting, augmenting or enhancing quantity of the product of claim 2.

* * * * *